(12) United States Patent  
Cavaliere et al.

(10) Patent No.: US 12,231,333 B2  
(45) Date of Patent: Feb. 18, 2025

(54) ROUTING FLEXE DATA IN A NETWORK

(71) Applicant: Telefonaktiebolaget LM Ericsson (PUBL), Stockholm (SE)

(72) Inventors: Fabio Cavaliere, Pisa (IT); Daniele Ceccarelli, Sollentuna (SE); Paolo Debenedetti, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 283 days.

(21) Appl. No.: 17/593,385

(22) PCT Filed: Mar. 20, 2019

(86) PCT No.: PCT/EP2019/057007  
§ 371 (c)(1),  
(2) Date: Sep. 17, 2021

(87) PCT Pub. No.: WO2020/187418  
PCT Pub. Date: Sep. 24, 2020

(65) Prior Publication Data  
US 2022/0158938 A1 May 19, 2022

(51) Int. Cl.  
*H04L 45/50* (2022.01)  
*H04J 3/16* (2006.01)

(52) U.S. Cl.  
CPC ............ *H04L 45/50* (2013.01); *H04J 3/1658* (2013.01)

(58) Field of Classification Search  
None  
See application file for complete search history.

(56) References Cited

U.S. PATENT DOCUMENTS

| 2016/0028625 | A1* | 1/2016 | Hari | H04L 45/74 370/392 |
| 2018/0013511 | A1* | 1/2018 | Hussain | G02B 6/12033 |
| 2018/0145928 | A1* | 5/2018 | Zhong | H04L 47/783 |
| 2018/0159785 | A1 | 6/2018 | Wu et al. | |

(Continued)

FOREIGN PATENT DOCUMENTS

| CN | 106411454 A | 2/2017 |
| CN | 106911426 A | 6/2017 |

(Continued)

OTHER PUBLICATIONS

PCT Notification of Transmittal of the International Search Report and the Written Opinion of the International Searching Authority, or the Declaration issued for International application No. PCT/EP2019/057007—Oct. 31, 2019.

(Continued)

*Primary Examiner* — Jay L Vogel  
(74) *Attorney, Agent, or Firm* — Baker Botts L.L.P.

(57) ABSTRACT

Methods and apparatus are provided for routing Flex Ethernet (FlexE) data in a network. In an example aspect, a method comprises receiving data on a first FlexE physical layer (PHY) group, determining, from first FlexE overhead on the first FlexE PHY group, that data in one or more time slots on the first FlexE PHY group is associated with a predetermined path in the network, determining a second FlexE PHY group for the data in the one or more time slots based on at least a portion of the predetermined path in the network, and sending the data on the second FlexE PHY group.

19 Claims, 3 Drawing Sheets

(56) References Cited

U.S. PATENT DOCUMENTS

| | | | |
|---|---|---|---|
| 2019/0097914 A1* | 3/2019 | Zhong | H04J 3/1658 |
| 2019/0181999 A1 | 6/2019 | Du et al. | |
| 2019/0372717 A1* | 12/2019 | Zhang | H04L 1/0061 |
| 2021/0083943 A1* | 3/2021 | Chen | H04L 5/0053 |
| 2021/0119912 A1* | 4/2021 | Du | H04L 45/64 |
| 2021/0273826 A1* | 9/2021 | Ye | H04L 49/357 |

FOREIGN PATENT DOCUMENTS

| | | | | |
|---|---|---|---|---|
| CN | 108449166 A | 8/2018 | | |
| WO | WO2017201953 A1 | 11/2017 | | |
| WO | 2018 006305 A1 | 1/2018 | | |
| WO | WO-2018149296 A1 * | 8/2018 | | H04L 29/08 |
| WO | WO-2020156352 A1 * | 8/2020 | | H04J 3/1658 |

OTHER PUBLICATIONS

RSVP-TE Signaling Extensions in support of Flexible Ethernet networks by Q. Wang, Ed. ZTE—Mar. 21, 2016.
Official Communication issued for Chinese Patent Application No. 201980094312.4—Dec. 14, 2022.
Search Report issued for Chinese Patent Application No. 2019800943124—Dec. 6, 2012.
Q. Wang, Ed., ZTE, "RSVP-TE Signaling Extensions in support of Flexible Ethernet networks" Internet Engineering Task Force—Mar. 21, 2016.
Gmpls Routing and Signaling Framework for Flexible Ethernet (FlexE) by I. Hussain et al.—Nov. 7, 2018.
Communication Pursuant to Article 94(3) EPC issued for Application No. 19 713 410.9-1215—Feb. 27, 2024.
"Flex Ethernet 2.0 Implementation Agreement", Optical Internetworking Forum—Jun. 22, 2018.

\* cited by examiner

ROUTING FLEXE DATA IN A NETWORK

PRIORITY

This nonprovisional application is a U.S. National Stage Filing under 35 U.S.C. § 371 of International Patent Application Serial No. PCT/EP2019/057007 filed Mar. 20, 2019 and entitled "ROUTING FLEXE DATA IN A NETWORK" which is hereby incorporated by reference in its entirety.

TECHNICAL FIELD

Examples of the present disclosure relate to routing Flex Ethernet (FlexE) data in a network.

BACKGROUND

The Flexible Ethernet (FlexE) Implementation Agreement 02.0 defined by the Optical Internetworking Forum (OIF), which is incorporated herein by reference, provides a mechanism for supporting a variety of Ethernet MAC rates that may or may not correspond to any existing Ethernet physical layer (PHY) rate. This includes MAC rates that are both greater than (through bonding) and less than (through sub-rate and channelization) the Ethernet PHY rates used to carry FlexE. A PHY is an implementation of a physical layer, such as for example an optical communications link or a wireless connection between devices. The Implementation Agreement defines FlexE Client MAC rates of 10, 40, and m×25 Gb/s, and defines that a FlexE Group may comprise 1 to n bonded Ethernet PHYs.

Multi-Protocol Label Switching (MPLS) is a routing technique in a communications network. In an MPLS network, data packets are assigned labels. A packet-forwarding decision (e.g. which node is the next hop) are made based on the label of a packet, without considering the packet contents such as destination address. This may allow creation of an end-to-end (E2E) path across one or more networks, referred to as a label switched path (LSP).

When a router receives a packet, it may use the label included with the packet to determine, for example from a lookup table, the next hop along the label switched path and a corresponding replacement label for the packet. The label is then replaced with the replacement label before the packet is forwarded to the next hop.

SUMMARY

One aspect of the present disclosure provides a method of routing Flex Ethernet (FlexE) data in a network. The method comprises receiving data on a first FlexE physical layer (PHY) group, and determining, from first FlexE overhead on the first FlexE PHY group, that data in one or more time slots on the first FlexE PHY group is associated with a predetermined path in the network. The method also comprises determining a second FlexE PHY group for the data in the one or more time slots based on at least a portion of the predetermined path in the network, and sending the data on the second FlexE PHY group.

A still further aspect of the present disclosure provides apparatus for routing Flex Ethernet (FlexE) data in a network. The apparatus comprises processing circuitry and a memory. The memory contains instructions executable by the processing circuitry such that the apparatus is operable to receive data on a first FlexE physical layer (PHY) group, determine, from first FlexE overhead on the first FlexE PHY group, that data in one or more time slots on the first FlexE PHY group is associated with a predetermined path in the network, determine a second FlexE PHY group for the data in the one or more time slots based on at least a portion of the predetermined path in the network, and send the data on the second FlexE PHY group.

An additional aspect of the present disclosure provides a network comprising a predetermined path for data communications from a first node to a second node. The predetermined path comprises routing apparatus. The routing apparatus is configured to receive data on a first FlexE physical layer (PHY) group, determine, from first FlexE overhead on the first FlexE PHY group, that data in one or more time slots on the first FlexE PHY group is associated with a predetermined path in the network, determine a second FlexE PHY group for the data in the one or more time slots based on at least a portion of the predetermined path in the network, and send the data on the second FlexE PHY group.

Another aspect of the present disclosure provides apparatus for routing Flex Ethernet (FlexE) data in a network. The apparatus is configured to receive data on a first FlexE physical layer (PHY) group, determine, from first FlexE overhead on the first FlexE PHY group, that data in one or more time slots on the first FlexE PHY group is associated with a predetermined path in the network, determine a second FlexE PHY group for the data in the one or more time slots based on at least a portion of the predetermined path in the network, and send the data on the second FlexE PHY group.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
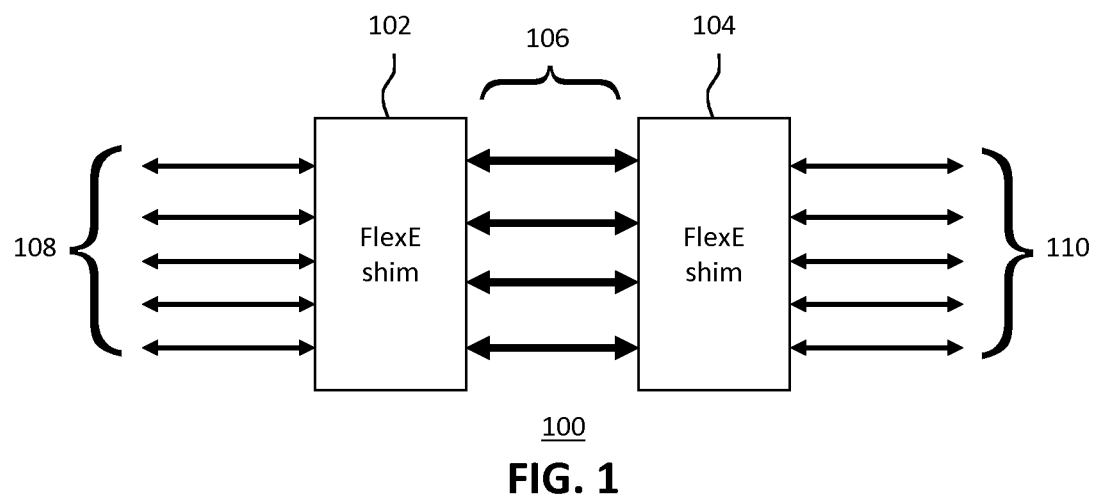
FIG. 1 is a schematic illustration of an example of a FlexE communications system.

FIG. 1 shows an example of a FlexE communications system 100. The system 100 includes a first FlexE shim 102 and a second FlexE shim 104. The FlexE shims 102 and 104 are connected by one or more communication links 106 or PHYs, collectively referred to as a FlexE group. According to the current FlexE standard (Implementation Agreement), a FlexE group may contain between 1 and 254 PHYs.

The first FlexE shim 102 is connected to a number of Ethernet clients 108. The second FlexE shim 10 is connected to the same number of Ethernet clients 110. A client 108 connected to the FlexE shim 102 has a corresponding client 110 connected to the FlexE shim 104, such that the clients may communicate via the shims and over the FlexE group 106.

Figure 2:
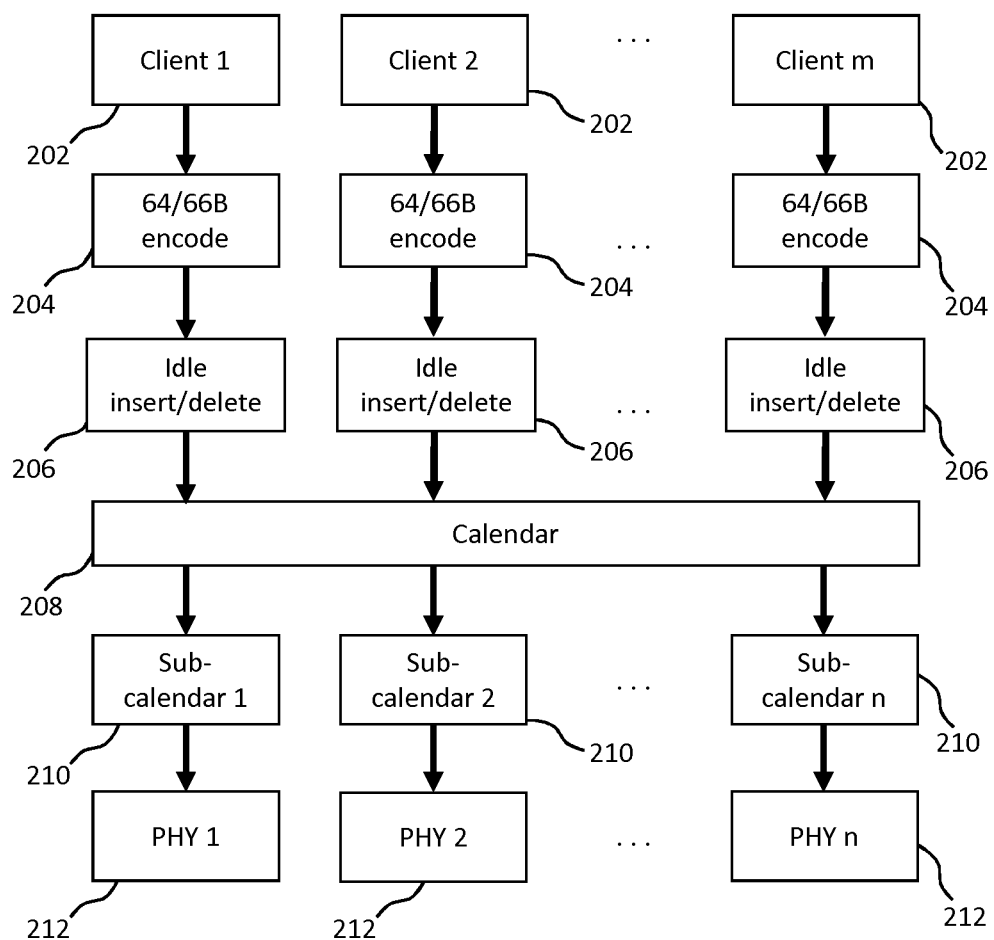
FIG. 2 is a schematic illustration of an example of functions of a FlexE multiplexer.

FIG. 2 shows an example of functions of a FlexE multiplexer (FlexE mux), one or more of which may be implemented by a FlexE shim. A plurality of FlexE clients 202 wish to transmit data to corresponding clients over a PHY or a FlexE group. Each client 202 provides data in the form of 64 bit blocks to a respective 64/66B encode block 204. Each 64/66B encode block 204 encodes 64-bit blocks of data from the respective client as 66-bit blocks, also known as Physical Coding Sublayer (PCS) blocks, and provides the 66-bit blocks to a respective idle insert/delete block 206. The idle insert/delete blocks insert 'idle' control blocks into the data stream when there is no data to transmit from the respective client, and/or when the block rate into calendar function 208 is higher than that provided by the idle insert/delete block 204. The output of each idle insert/delete block 206 is in the form of a stream of 66-bit blocks and is provided to calendar function 208.

The calendar function 208 arranges 66-bit blocks from each idle insert/delete block for scheduling for transmission on the PHYs of a FlexE group. The calendar function provides a respective sub-calendar 210 for each PHY 212 of n PHYs in the FlexE group. Each sub-calendar 210 comprises 66-bit blocks for transmission on a respective PHY 212 of the FlexE group.

The calendar has a granularity of around 5 Gbps, and has a length of 20 slots per 100 Gbps of FlexE group capacity. Therefore, for example, where a FlexE group is made up of n 100 Gbps PHYs, the length of the calendar is 20n slots. Each slot carries a 66-bit block. Two calendar configurations are supported: an "A" and a "B" calendar configuration. At any given time, one of the calendar configurations is used for mapping data clocks from the FlexE clients into the calendar. The two calendar configurations are provided to facilitate reconfiguration.

The sub-calendar for a PHY includes a repeating assignment of twenty 66-bit blocks to the FlexE client flows (data from FlexE clients) that are being carried on that PHY. The slots are numbered 0-19. The blocks transmitted on each PHY also include overhead blocks. One 66-bit overhead block is inserted for every 1023 repetitions of the sub-calendar (i.e. after every 1023×20 66-bit data blocks). Eight 66-bit overhead blocks comprise an overhead frame. 32 overhead frames comprise an overhead multiframe.

An overhead multiframe is arranged as follows. The first 66-bit block in an overhead frame in the multiframe has the value 0x4B in bits 0-7 and 0x5 in bits 32-35. These two values indicate that the block is the first block in an overhead frame. Each overhead frame also indicates the FlexE group number in which the PHY belongs (that is, the overhead frame is received on a particular PHY, and the PHY is in a FlexE group indicated by the group number). The second overhead block (transmitted 1023 sub-calendar repetitions later than the first overhead block) carries PHY information, including a PHY map. There can be 254 PHYs combined in a group (with identification 1-254), and each bit in the 256-bit PHY map indicates whether a PHY with that number exists in the FlexE group. Each overhead frame includes eight bits of the PHY map, and so all of the second overhead frame blocks of the 32-frame overhead multiframe transmit the complete PHY map. The second block of the overhead frame also indicates the PHY number (0-255) of the PHY carrying the overhead frame. Alternatively, the second block of the overhead frame indicates the instance number of the PHY instance carrying the overhead frame. An instance is a 100 Gbps portion of a physical layer (PHY) of a FlexE connection. If the PHY is a 100 Gbps PHY, the instance and the PHY may be synonymous. If, for example, the PHY is a 200 Gbps or 400 Gbps PHY, the PHY includes multiple instances (e.g. four 100 Gbps instances for a 400 Gbps PHY).

The third block in an overhead frame carries the client distribution information, i.e. the client numbers to which each slot in the 20-slot sub-calendar is assigned. This can also be referred to as the calendar configuration. There are twenty 5 Gbps slots in a sub-calendar for a 100 Gbps PHY, so twenty of the third overhead frame blocks in an overhead multiframe are used to indicate which client data each slot carries. There are two calendar configurations, "A" and "B", and so the overhead multiframe indicates, for each of the 20 slots, which client has been assigned that slot for both calendar configurations. The overhead frame also indicates which calendar configuration is currently in use. The bit indicating the calendar in use is repeated three times in the frame to counter transmission errors. Blocks four to eight of the overhead frame are currently reserved for management data. As there are 20 calendar slots, the calendar configuration is included within the first 20 overhead frames of an overhead multiframe. In the remaining 12 frames of the overhead multiframe, the fields used for calendar configuration are reserved.

An overhead block contains a Calendar switch Request (CR) bit that can be used by a sending entity (e.g. sending FlexE shim) to send a request to the receiving entity (eg. Receiving FlexE shim) that a calendar configuration (A or B configuration) other than the one currently being used should be used. An overhead block also contains a Calendar switch Acknowledge (CA) bit used to acknowledge the calendar configuration switch in the reverse direction (i.e. the CA bit is in overhead sent over the PHY in the reverse direction).

The first block in an overhead frame can be used to align incoming data, e.g. determine the slot number of frames following the overhead frame, and determine the slot and overhead frame number for subsequent overhead frames.

Figure 3:
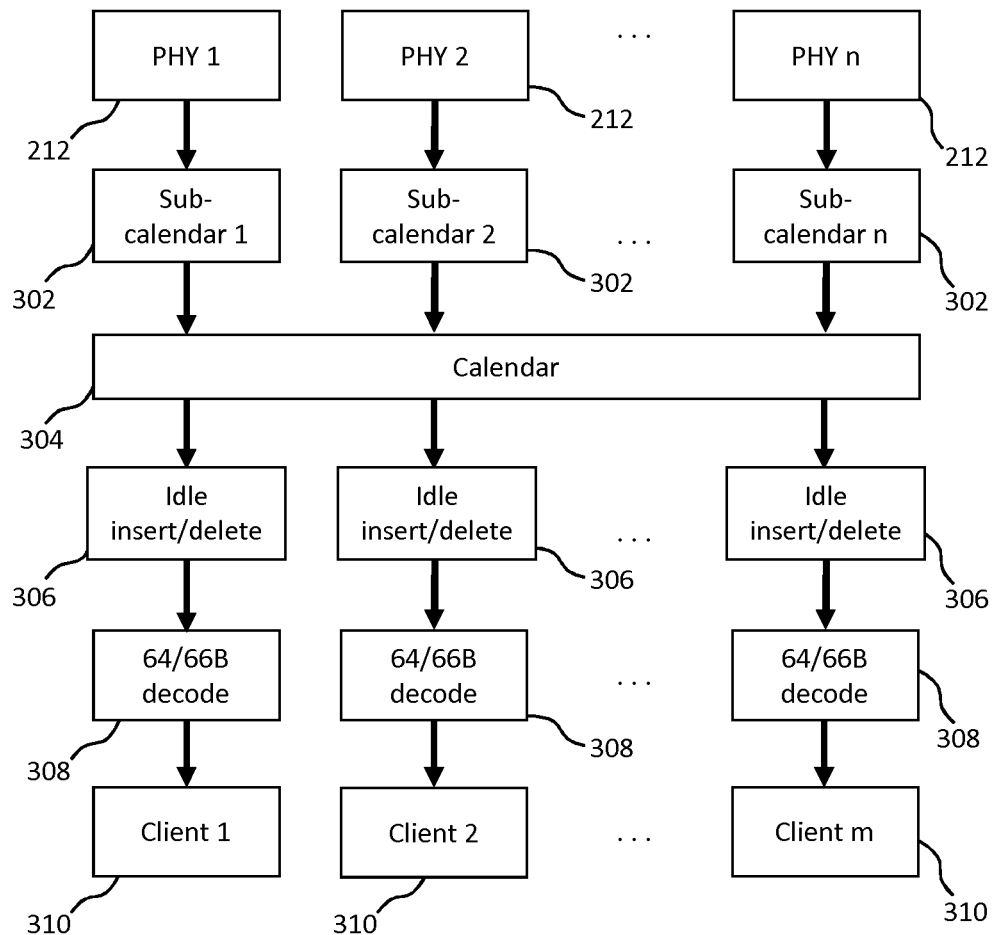
FIG. 3 is a schematic illustration of an example of functions of a FlexE demultiplexer.

FIG. 3 shows an example of functions of a FlexE demultiplexer (FlexE demux), one or more of which may be implemented by a FlexE shim. 66-bit blocks of data are received from each of n PHYs 212 and provided to respective sub-calendars 302. These are arranged into a calendar 304 that may in some implementations be identical to the calendar 208 shown in FIG. 2. The 66-bit blocks from the calendar (not including overhead blocks) are provided to the appropriate idle insert/delete blocks 306, each of which is associated with a client flow for a client. The idle insert/delete blocks may delete idle control blocks from the stream of blocks from the calendar 304. The output of each idle insert/delete block 306 is provided to a respective 64/66B decode block, which decodes the 66-bit blocks into 64-bit data blocks, and provides the 64-bit blocks to the respective one of m clients 310.

Each client 310 is associated with one of the clients 202 shown in FIG. 1, and associated clients communicate in a bi-directional manner. Therefore, for example, a FlexE shim at one end of the PHYs includes a FlexE mux and a demux, and similarly a FlexE shim at the other end of the PHYs also includes a mux and a demux. Associated clients are identified using the same identifier (e.g. client number) in the calendar client distribution information in the overhead going in both directions between the shims.

The information comprising the PHY map and calendar client distribution information (for both calendars) can be used by a FlexE demux to check that the demux is correctly assigning time slots in which data is received to the correct client, and thus to check that the received data is going to the correct client. The information can also be used by the demux to reconfigure the calendar that is not in use (A or B), as the demux can configure the calendar that is not in use using the information in the overhead. The information is sent to the demux in the overhead by a FlexE mux, and may also be determined by the FlexE mux or a system operator.

The FlexE implementation agreement does not specify advanced traffic engineering techniques, for example similar to MPLS, that may be used for effective E2E switching or for defining a path through a network (where the path includes at least a portion that is through a FlexE node).

Figure 4:
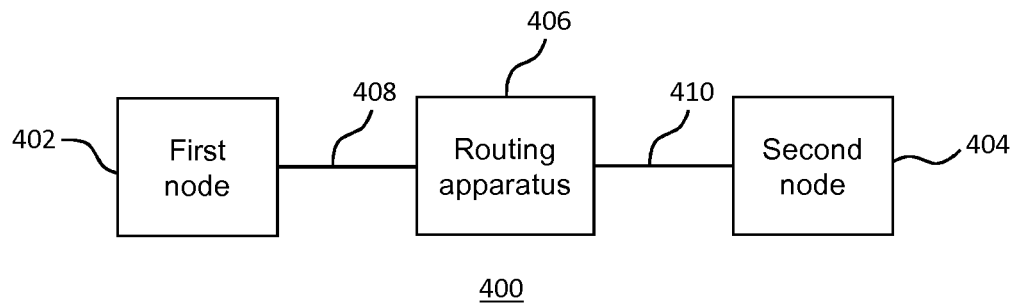
FIG. 4 is a schematic illustration of an example of a network.

FIG. 4 is a schematic of an example of a network 400. The network 400 includes a first node 402 and a second node 404, and routing apparatus 406. The network may include a predefined path, such as for example a label switched path (LSP), between the first node 402 and the second node 404. The predefined path may comprise or include FlexE links 408 and 410 (which may each comprise for example single PHYs or multiple PHYs in a FlexE group). The routing apparatus 406 may also in some examples transmit and/or receive data on one or more other PHYs (not shown) in one or more other FlexE groups. The first node 402 and second node 404 may be for example a source and sink of data respectively, or alternatively may be for example ingress and egress nodes for the network 400 (i.e. the ultimate source and/or ultimate sink of data may be a node that resides in another network).

Figure 5:
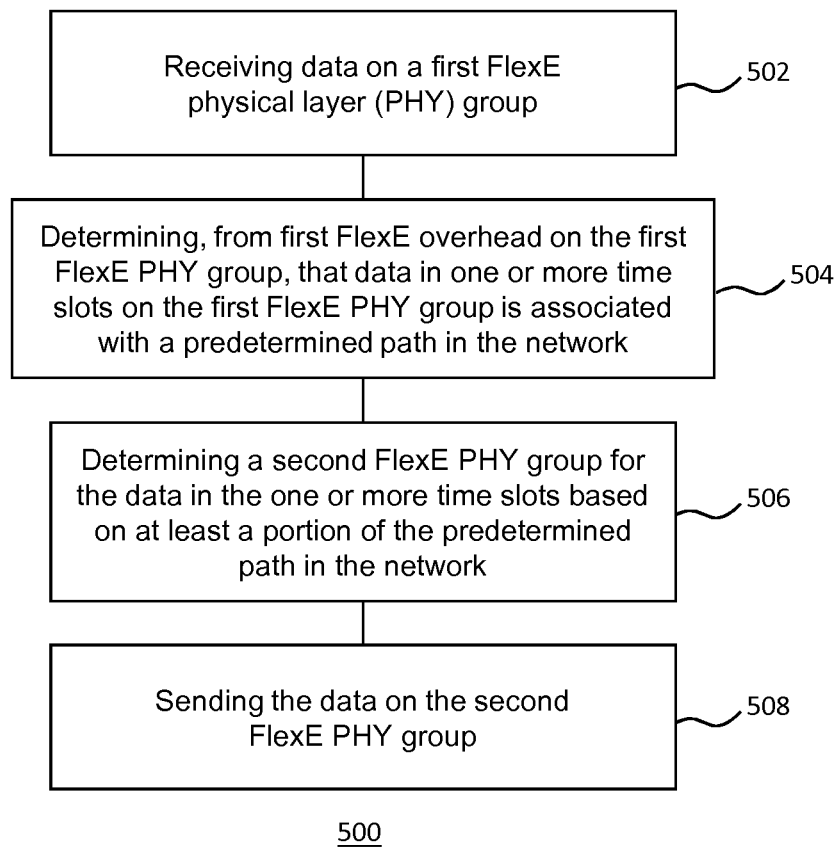
FIG. 5 is a flow chart of an example of method of routing FlexE data in a network.

FIG. 5 is a flow chart of an example of a method 500 of routing Flex Ethernet (FlexE) data in a network. The method 400 may be carried out for example by a routing apparatus, such as the routing apparatus 400 shown in FIG. 4. The method 500 comprises, in step 502, receiving data on a first FlexE physical layer (PHY) group. The FlexE PHY group may comprise one or more FlexE PHYs. The method 500 also comprises, in step 504, determining, from first FlexE overhead on the first FlexE PHY group, that data in one or more time slots on the first FlexE PHY group is associated with a predetermined path in the network. This information can be included in the FlexE overhead in an suitable manner.

In step 506, the method 500 comprises determining a second FlexE PHY group for the data in the one or more time slots based on at least a portion of the predetermined path in the network. For example, the information determined in step 504 can be used to determine that the data is being transmitted along a particular path (the predetermined path) through the network, and thus should be forwarded on a particular FlexE PHY group (the second FlexE PHY group), for example in a manner similar to MPLS.

The method 500 then comprises sending the data on the second FlexE PHY group in step 508. In some examples, the data is sent on the same time slots in which it was received on the first FlexE PHY group. That is, for example, the data is sent on the same time slot index or indexes (numbered 1 to 20), although the same time slot index may not be simultaneous between the FlexE groups. In other examples different time slots (e.g. different time slot indexes) may be used for transmitting the data on the second FlexE PHY group. In some examples, information regarding which time slots to use on the second FlexE group for transmitting the data may be received on the FlexE overhead of the first FlexE group, or in another manner e.g. in one or messages from a network controller. Alternatively, in some examples, the node performing the method 500 (e.g. routing apparatus 400) may determine the slots to use, for example from available slots.

In some examples, the step 506 of determining the second FlexE PHY group for the data in the one or more time slots based on at least a portion of the predetermined path in the network may comprise determining the second FlexE PHY group based on a mapping between the at least the portion of the predetermined path in the network and the second FlexE PHY group. That is, for example, the mapping may indicate that data associated with the predetermined path should be transmitted on the second FlexE PHY group. For example, the mapping may indicate that the second FlexE PHY group is used for data on the at least the portion of the predetermined path in the network. The mapping may be received in some examples in the first FlexE overhead on the first FlexE PHY group and/or from a network controller.

In some examples, the step 506 of determining the second FlexE PHY group for the data in the one or more time slots further comprises determining an output port for the data based on the predetermined path in the network. That is, for example, the data associated with the predetermined path should be transmitted from a particular output port or group of output ports. Therefore, for example, sending the data on the second FlexE PHY group in step 508 may comprise sending the data on the second FlexE PHY group through the output port.

The step 504 of determining, from the first FlexE overhead on the first FlexE PHY group, that the data in the one or more time slots on the first FlexE PHY group is associated with the predetermined path in the network may in some examples comprise determining, for each of the one or more time slots, that a first FlexE overhead frame associated with the one or more time slots has a first predetermined value in a FlexE group number field and a second predetermined value in a calendar slot client name field (for the A or B calendar). A FlexE overhead frame of a FlexE overhead multiframe (comprising 32 FlexE overhead frames) may be associated with a particular time slot of the first FlexE group. That is, for example, the first overhead frame may indicate the client number associated with the first time slot in block 3, the second overhead frame may indicate the client number associated with the second time slot in block 3, and so on. Thus, the first 20 frames of the multiframe may be each be associated with a respective time slot. The remaining 12 frames of the multiframe may not be associated with particular time slots. The group number field may be included in block 1 of each frame, and is expected to be the same for all frames in the multiframe received on the first FlexE PHY group.

Therefore, for example, the FlexE group number and client name field in a frame associated with a time slot, if these are equal to predetermined values, can be considered as a "label" for data received on that FlexE PHY group. This may thus indicate that the data should be forwarded on the second FlexE PHY group, which would put into effect routing the data along the predetermined path. When the data is sent on the second FlexE PHY group, it may be sent on the same or different time slot(s) on which they were received on the First FlexE group. However, the "label" (the group number and client name fields in the appropriate frames of the overhead multiframe transmitted on the second FlexE PHY group) may be different, as the group number and/or client name fields may be different. This change in label may be determined e.g. from a lookup table, from mapping information received as suggested above, or in any other suitable manner. (The mapping information may also indicate that the group number and/or client name field may remain unchanged.) Although using the group number and client name fields are given as a specific example, other fields in the FlexE overhead may be used instead or in addition. For example, both client name fields (for A and B calendars) may be used, reserved fields may be used, and/or other fields may be used.

In some examples, the label may be included in both A and B calendars. For example, the label may be present for a first set of one or more time slots of the A calendar, whereas the label may be present for a second set of one or more time slots of the B calendar. The two sets may be identical, or may be different and/or have one or more common time slots. The two sets may also have the same or different numbers of time slots. Thus, if there is a calendar switch from A to B, for example, the data associated with the predetermined path is expected to be received on the second set of time slots instead of the first set of time slots.

In some examples, sending the data on the second FlexE PHY group in step 508 of the method 500 comprises transmitting the data in one or more time slots on the second FlexE PHY group. This may comprise for example transmitting second FlexE overhead on the second FlexE PHY group, wherein the second FlexE overhead on the second FlexE PHY group indicates that the data in the one or more time slots on the second FlexE PHY group is associated with the predetermined path in the network. For example, the group number and client name fields of an overhead frame associated with a time slot on the second FlexE PHY group may be certain values that can be identified by the next hop on the predetermined path (i.e. at the other end of the second FlexE PHY group), so that the next hop can also determine that the data should be routed along the predetermined path. In some examples, the one or more time slots on the second FlexE PHY group are associated with one or more time slot indexes that are the same as one or more time slot indexes associated with the time slots on the first FlexE PHY group. For example, if the data is received in time slots 1, 8 and 15 of the calendar of the first FlexE PHY group, the data may be transmitted in time slots 1, 8 and 15 of the second FlexE PHY group—even though these time slots may or may not be time-synchronized between the two FlexE PHY groups. Alternatively, the one or more time slots on the second FlexE PHY group are associated with one or more time slot indexes that are different to one or more time slot indexes associated with the time slots on the first FlexE PHY group.

The "new" time slots to use on the second FlexE group may be determined in any suitable manner, for example from mapping information. For example, an indication may be received that the one or more time slots on the second FlexE PHY group are associated with the predetermined path in the network on the first FlexE overhead, and the indication may be received for example on the first FlexE PHY group and/or from a network controller.

In some examples, the first FlexE overhead on the first FlexE PHY group and the second FlexE overhead on the second FlexE PHY group indicates one or more of a cyclic redundancy check (CRC) for the data in the one or more time slots and an identifier of a service (for example a name) associated with the data in the one or more time slots. In some examples, the identifier or name of the service could be used to determine that data in particular time slots (e.g. those associated with the named service) should be routed along the predetermined path.

Figure 6:
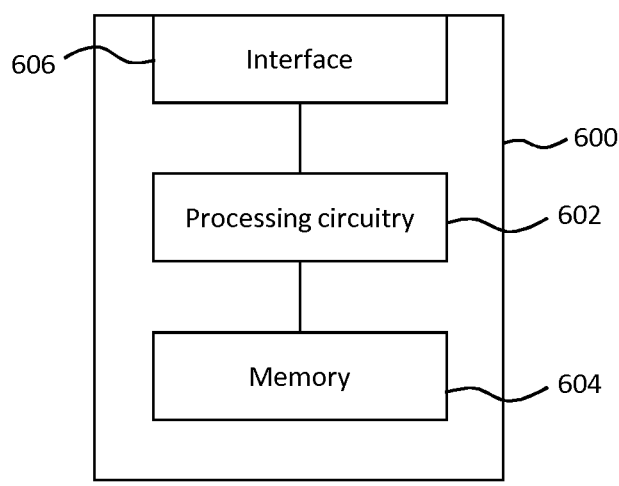
FIG. 6 is a schematic of an example of apparatus for routing FlexE data in a network.

FIG. 6 is a schematic of an example of apparatus 600 for routing Flex Ethernet (FlexE) data in a network. The apparatus 600 comprises processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable to receive data on a first FlexE physical layer (PHY) group, determine, from first FlexE overhead on the first FlexE PHY group, that data in one or more time slots on the first FlexE PHY group is associated with a predetermined path in the network, determine a second FlexE PHY group for the data in the one or more time slots based on at least a portion of the predetermined path in the network, and send the data on the second FlexE PHY group. In some examples, the apparatus 600 is operable to carry out the method 500 described above.

Further example embodiments will now be described. Embodiments described herein may for example indicate the content to include in FlexE overhead for a FlexE group, and may also define a Traffic Container (TC) as a set of one or more time slots carrying data for a single FlexE client, that is managed as a single switchable entity.

Management plane information may be associated with each Traffic Container. This overhead information may be referred to as Traffic Container Overhead (TC-OH). This overhead may be carried within FlexE overhead, for example within currently reserved bytes of the FlexE overhead or, alternatively, in a dedicated time slot of a FlexE calendar. The TC-OH may carry information relating to the traffic container, such as one or more of the following:

Name or identifier of the service associated with the TC;
a Cyclic Redundancy Check (CRC) for data within the TC, for end-to-end monitoring or link monitoring It is proposed in some embodiments to use FlexE overhead fields that indicate FlexE group number and FlexE client name (for calendar A or calendar B) as a single label to identify data associated with a particular traffic container (e.g. if these two values together equal predetermined values or a "label"). Therefore, for example, a routing apparatus may recognise (e.g. from mapping or other information received from a network controller) that data received on a first FlexE PHY group in time slot(s) has FlexE group number and client number fields having particular values in overhead frame(s) associated with the time slot. The routing apparatus may thus for example recognise that the particular values are a label associated with the data in the time slot(s), and forward this data on the second FlexE PHY group (indicated by the group number in the map field) from the port identified in the client name field.

An ordered sequence of labels associated with a predetermined path (e.g. label switched path, LSP) may define the overall routing of a traffic container (TC) in the network. That is, for example, each router in the network along the path may receive information that will allow the router to identify traffic associated with a particular traffic container and forward that traffic to the next hop along the path. The number of time slots that are identified as carrying data for a particular traffic container (e.g. because they have the same FlexE group number and client name fields in the associated overhead frames) may also indicate the bandwidth of the traffic container, as for example each time slot has a 5 Gbps bandwidth. Additionally or alternatively, it may be specified (e.g. in a control plane or by a network controller) whether the traffic container uses time-slot interchange at each hop. That is, whether the time slots remain the same for the egress FlexE PHY group (second FlexE PHY group) at a router, or whether different time slots are used and what those time slots should be. The label to be included in the overhead for the traffic container in the egress FlexE PHY group may also be specified; this label may be used by the next hop to identify traffic associated with the traffic container, for example.

In some examples, end-to-end (E2E) traffic engineering based on MPLS and software defined networking (SDN) can be implemented using FlexE by re-interpreting existing FlexE overhead fields as follows:

- FlexE client ports (e.g. connected to a client) are redefined as F-UNI (FlexE user to network interface);
- FlexE ports (e.g. connected to a FlexE PHY or PHY group) are redefined as F-NNI (FlexE network to network interface);
- FlexE client names (for calendar A or B) are redefined as a TC-LSP (Traffic Container label switched path) label, in some examples along with the group number and/or the calendar bit The TC-LSP may in some examples be defined as the E2E path for data for a client service from an ingress F-UNI through one or more routers or switches to an egress F-UNI. End-to-End switching of traffic for the Traffic Container may in some examples be implemented as follows:

- Each switch or router (e.g. in a metropolitan transport network or G.mtn) can be for example either F-LSR (FlexE Label Switching Router) or F-LER (FlexE Label Edge Router)
- A F-LER maps data from a FlexE client received at a F-UNI into the timeslots of a FlexE calendar on a F-NNI, and inserts an appropriate TC-LSP label into the overhead (e.g. the frames associated with the time slots) on the F-NNI
- Each intermediate F-LSR extracts the TC-LSP data from timeslots based on the TC-LSP label (e.g. by identifying the label from particular values in one or more fields of the overhead) and transmits on a F-NNI using a next-hop TC-LSP label inserted into the overhead
- At the end of the path the F-LER extracts the data from the relevant timeslots using the assigned TC-LSP label, and forwards the data to the FlexE client F-UNI port TC-OH can be carried for example over reserved fields of the FlexE overhead. For example, 384 bits are currently reserved per overhead superframe in the calendar A and B client name/number fields in overhead frames 21 to 32. These bits can be used to carry the TC-OH. Alternatively, TC-OH can be carried in a dedicated time slot of the FlexE payload. The network can be controlled either by a distributed generalized MPLS (GMPLS) control plane, for example with extensions for traffic container (TC) management, or by a centralized SDN controller with Segment Routing (or Source Routing). In both cases, the TC-LSP labels (and any allocated time slots for carrying TC data from each node) may be distributed to the nodes to ensure proper allocation of the F-NNI ports as well as the allocated calendar slots.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of routing Flex Ethernet, FlexE, data in a network, the method comprising:
    receiving data on a first FlexE physical layer, PHY, group;
    determining, from a first FlexE overhead on the first FlexE PHY group, that data in one or more first time slots on the first FlexE PHY group is associated with a predetermined path in the network, wherein the first FlexE overhead comprises at least two calendar configurations for assigning each of the one or more first time slots to one or more receiving clients, wherein the first FlexE overhead further comprises a calendar switch request bit that is configured to be used by the sending node to send a request to the receiving node to switch a currently used calendar configuration;
    determining a second FlexE PHY group for the data in one or more second time slots based on at least a portion of the predetermined path in the network, wherein information identifying the one or more second time slots to be used for sending the data to the second FlexE PHY group is indicated in the first FlexE overhead on the first FlexE PHY group; and
    sending the data on the second FlexE PHY group.

2. The method of claim 1, wherein determining the second FlexE PHY group for the data in the one or more time slots based on at least a portion of the predetermined path in the network comprises determining the second FlexE PHY group based on a mapping between the at least the portion of the predetermined path in the network and the second FlexE PHY group.

3. The method of claim 2, wherein the mapping indicates that the second FlexE PHY group is used for data on the at least the portion of the predetermined path in the network.

4. The method of claim 2, wherein the mapping is received on a first FlexE overhead on the first FlexE PHY group and/or from a network controller.

5. The method of claim 1, wherein determining the second FlexE PHY group for the data in the one or more time slots further comprises determining an output port for the data in the one or more time slots based on the predetermined path in the network; and sending the data on the second FlexE PHY group comprises sending the data on the second FlexE PHY group through the output port.

6. The method of claim 1, wherein determining, from the first FlexE overhead on the first FlexE PHY group, that the data in the one or more time slots on the first FlexE PHY group is associated with the predetermined path in the network comprises determining, for each of the one or more time slots, that a first FlexE overhead frame associated with the one or more time slots has a first predetermined value in a FlexE group number field and a second predetermined value in a calendar slot client name field.

7. The method of claim 1, wherein sending the data on the second FlexE PHY group comprises transmitting the data in one or more time slots on the second FlexE PHY group.

8. The method of claim 7, comprising transmitting second FlexE overhead on the second FlexE PHY group wherein the second FlexE overhead on the second FlexE PHY group indicates that the data in the one or more time slots on the second FlexE PHY group is associated with the predetermined path in the network.

9. The method of claim 7, wherein the one or more time slots on the second FlexE PHY group are associated with one or more time slot indexes that are the same as one or more time slot indexes associated with the time slots on the first FlexE PHY group.

10. The method of claim 7, wherein the one or more time slots on the second FlexE PHY group are associated with one or more time slot indexes that are different to one or more time slot indexes associated with the time slots on the first FlexE PHY group.

11. A computer program product comprising non-transitory computer readable media having stored thereon a computer program comprising instructions which, when executed on processing circuitry, cause the processing circuitry to carry out a method according claim 1.

12. Apparatus for routing Flex Ethernet, FlexE, data in a network, the apparatus comprising processing circuitry and a memory, the memory containing instructions executable by the processing circuitry such that the apparatus is operable to:
  receive data on a first FlexE physical layer, PHY, group;
  determine, from a first FlexE overhead on the first FlexE PHY group, that data in one or more time first slots on the first FlexE PHY group is associated with a predetermined path in the network, wherein the first FlexE overhead comprises at least two calendar configurations for assigning each of the one or more first time slots to one or more receiving clients, wherein the first FlexE overhead further comprises a calendar switch request bit that is configured to be used by the sending node to send a request to the receiving node to switch a currently used calendar configuration;
  determine a second FlexE PHY group for the data in one or more second time slots based on at least a portion of the predetermined path in the network, wherein information identifying the one or more second time slots to be used for sending the data to the second FlexE PHY group is indicated in the first FlexE overhead on the first FlexE PHY group; and
  send the data on the second FlexE PHY group.

13. The apparatus of claim 12, wherein the memory contains instructions executable by the processing circuitry such that the apparatus is operable to determine the second FlexE PHY group for the data in the one or more time slots based on at least a portion of the predetermined path in the network by determining the second FlexE PHY group based on a mapping between the at least the portion of the predetermined path in the network and the second FlexE PHY group.

14. The apparatus of claim 13, wherein the mapping indicates that the second FlexE PHY group is used for data on the at least the portion of the predetermined path in the network.

15. The apparatus of claim 13, wherein the mapping is received on a first FlexE overhead on the first FlexE PHY group and/or from a network controller.

16. The apparatus of claim 12, wherein the memory contains instructions executable by the processing circuitry such that the apparatus is operable to determine the second FlexE PHY group for the data in the one or more time slots by determining an output port for the data in the one or more time slots based on the predetermined path in the network, and sending the data on the second FlexE PHY group by sending the data on the second FlexE PHY group through the output port.

17. The apparatus of claim 12, wherein the memory contains instructions executable by the processing circuitry such that the apparatus is operable to determine, from the first FlexE overhead on the first FlexE PHY group, that the data in the one or more time slots on the first FlexE PHY group is associated with the predetermined path in the network comprises determining, for each of the one or more time slots, that a first FlexE overhead frame associated with the one or more time slots has a first predetermined value in a FlexE group number field and a second predetermined value in a calendar slot client name field.

18. The apparatus of claim 12, wherein the memory contains instructions executable by the processing circuitry such that the apparatus is operable to send the data on the second FlexE PHY group by transmitting the data in one or more time slots on the second FlexE PHY group.

19. A network comprising a predetermined path for data communications from a first node to a second node, the predetermined path comprising routing apparatus, the routing apparatus configured to:
  receive data on a first FlexE physical layer, PHY, group;
  determine, from a first FlexE overhead on the first FlexE PHY group, that data in one or more first time slots on the first FlexE PHY group is associated with a predetermined path in the network, wherein the first FlexE overhead comprises at least two calendar configurations for assigning each of the one or more first time slots to one or more receiving clients, wherein the first FlexE overhead further comprises a calendar switch request bit that is configured to be used by the sending node to send a request to the receiving node to switch a currently used calendar configuration;
  determine a second FlexE PHY group for the data in one or more second time slots based on at least a portion of the predetermined path in the network, wherein information identifying the one or more second time slots to be used for sending the data to the second FlexE PHY group is indicated in the first FlexE overhead on the first FlexE PHY group; and
  send the data on the second FlexE PHY group.

* * * * *